(12) United States Patent
Wang

(10) Patent No.: US 11,845,001 B2
(45) Date of Patent: Dec. 19, 2023

(54) CALIBRATION SYSTEM AND METHOD FOR HANDHELD CONTROLLER

(71) Applicant: HTC Corporation, Taoyuan (TW)

(72) Inventor: Jian-Kai Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 48 days.

(21) Appl. No.: 17/457,917

(22) Filed: Dec. 7, 2021

(65) Prior Publication Data
US 2022/0219075 A1 Jul. 14, 2022

Related U.S. Application Data

(60) Provisional application No. 63/137,150, filed on Jan. 14, 2021.

(51) Int. Cl.
*A63F 13/22* (2014.01)
*A63F 13/211* (2014.01)
*G06T 7/73* (2017.01)

(52) U.S. Cl.
CPC ............ *A63F 13/22* (2014.09); *A63F 13/211* (2014.09); *G06T 7/73* (2017.01); *A63F 2300/1018* (2013.01)

(58) Field of Classification Search
CPC .............................. A63F 13/22; A63F 13/211; A63F 2300/1018; G06T 7/73
See application file for complete search history.

(56) References Cited

U.S. PATENT DOCUMENTS

| 6,086,236 A * | 7/2000 | De Raad | G05B 19/0423 |
| | | | 700/28 |
| 10,488,223 B1 * | 11/2019 | Yee | G01C 25/005 |
| 2002/0105484 A1 * | 8/2002 | Navab | G02B 27/017 |
| | | | 348/E13.052 |
| 2008/0167805 A1 * | 7/2008 | Hess | G06F 3/012 |
| | | | 340/815.4 |
| 2009/0209343 A1 * | 8/2009 | Foxlin | G06F 3/011 |
| | | | 463/36 |
| 2009/0280901 A1 * | 11/2009 | Casparian | A63F 13/428 |
| | | | 463/36 |
| 2010/0285879 A1 * | 11/2010 | Huang | A63F 13/335 |
| | | | 463/36 |

(Continued)

*Primary Examiner* — David L Lewis
*Assistant Examiner* — Shauna-Kay Hall
(74) *Attorney, Agent, or Firm* — CKC & Partners Co., LLC

(57) ABSTRACT

A calibration system configured to calibrate a handheld controller is disclosed. The calibration system includes a tracking camera, a displayer and a processing unit. The tracking camera is configured to capture streaming images involving the handheld controller. The displayer is configured to display a calibration test instruction. The processing unit is configured to receive first movement data generated by the handheld controller while the handheld controller moving; receive the streaming images captured by the tracking camera generated while the handheld controller moving; calculate second movement data according to the streaming images; calculate calibration parameters by comparing the first movement data and the second movement data; and, transmit the calibration parameters to the handheld controller. The calibration parameters are utilized by the handheld controller in generating a third movement data.

20 Claims, 8 Drawing Sheets

(56) References Cited

U.S. PATENT DOCUMENTS

| | | | |
|---|---|---|---|
| 2011/0095980 A1* | 4/2011 | Sweetser | G06F 3/0325 |
| | | | 345/158 |
| 2011/0242060 A1* | 10/2011 | McGibney | G06F 3/0428 |
| | | | 345/179 |
| 2013/0072297 A1* | 3/2013 | Seegers | A63F 13/213 |
| | | | 463/31 |
| 2017/0011553 A1* | 1/2017 | Chen | G06T 19/003 |
| 2017/0014710 A1* | 1/2017 | Rom | A63F 13/798 |
| 2018/0330521 A1* | 11/2018 | Samples | G06F 3/011 |
| 2019/0384419 A1* | 12/2019 | Li | G06F 3/014 |
| 2021/0132684 A1* | 5/2021 | Lin | G06F 3/011 |

* cited by examiner

CALIBRATION SYSTEM AND METHOD FOR HANDHELD CONTROLLER

RELATED APPLICATIONS

This application claims the priority benefit of U.S. Provisional Application Ser. No. 63/137,150, filed Jan. 14, 2021, which is herein incorporated by reference.

BACKGROUND

Field of Invention

The disclosure relates to a calibration system and a calibration method. More particularly, the disclosure relates to the calibration system and the calibration method for calibrating a handheld controller in an immersive system.

Description of Related Art

Virtual Reality (VR), Augmented Reality (AR), Substitutional Reality (SR), and/or Mixed Reality (MR) devices are developed to provide immersive experiences to users. When a user wearing a head-mounted display (HMD) device, the visions of the user will be covered by the immersive content shown on the head-mounted display device. The immersive content shows a virtual background and some virtual objects in an immersive scenario.

In some cases, the user may hold a handheld controller as an input device. In order to provide an immersive experience to the user, an immersive system is required to track a movement of the handheld controller and render the handheld controller in the immersive content. In this case, the user can manipulate the handheld controller to interact with the virtual objects in the immersive scenario. For example, the user can swing the virtual sword against a virtual monster in the immersive scenario. It is important that the movement of the handheld controller can be tracked correctly and precisely in real time.

SUMMARY

The disclosure provides a calibration system configured to calibrate a handheld controller. The calibration system includes a tracking camera, a displayer and a processing unit. The tracking camera is configured to capture a plurality of streaming images involving the handheld controller. The displayer is configured to display a calibration test instruction about moving the handheld controller along a predetermined route. The processing unit is communicated with the tracking camera and the user interface. The processing unit is configured to: receive first movement data generated by the handheld controller while the handheld controller moving along a predetermined route; receive the streaming images captured by the tracking camera generated while the handheld controller moving along the predetermined route; calculate second movement data according to the streaming images; calculate calibration parameters by comparing the first movement data and the second movement data; and, transmit the calibration parameters to the handheld controller. The calibration parameters are utilized by the handheld controller in generating a third movement data.

The disclosure provides a calibration method, which includes steps of: generating first movement data by a motion sensor embedded in a handheld controller while the handheld controller moving along a predetermined route; capturing a plurality of streaming images involving the handheld controller by a track camera while the handheld controller moving along the predetermined route; calculating second movement data according to the streaming images; calculating calibration parameters by comparing the first movement data and the second movement data; and, transmitting the calibration parameters to the handheld controller. The calibration parameters are utilized by the handheld controller in generating a third movement data.

The disclosure provides a non-transitory computer-readable storage medium, storing at least one instruction program executed by a processing unit to perform a calibration method. The calibration method include steps of: generating first movement data by a motion sensor embedded in a handheld controller while the handheld controller moving along a predetermined route; capturing a plurality of streaming images involving the handheld controller by a track camera while the handheld controller moving along the predetermined route; calculating second movement data according to the streaming images; calculating calibration parameters by comparing the first movement data and the second movement data; and, transmitting the calibration parameters to the handheld controller. The calibration parameters are utilized by the handheld controller in generating a third movement data.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
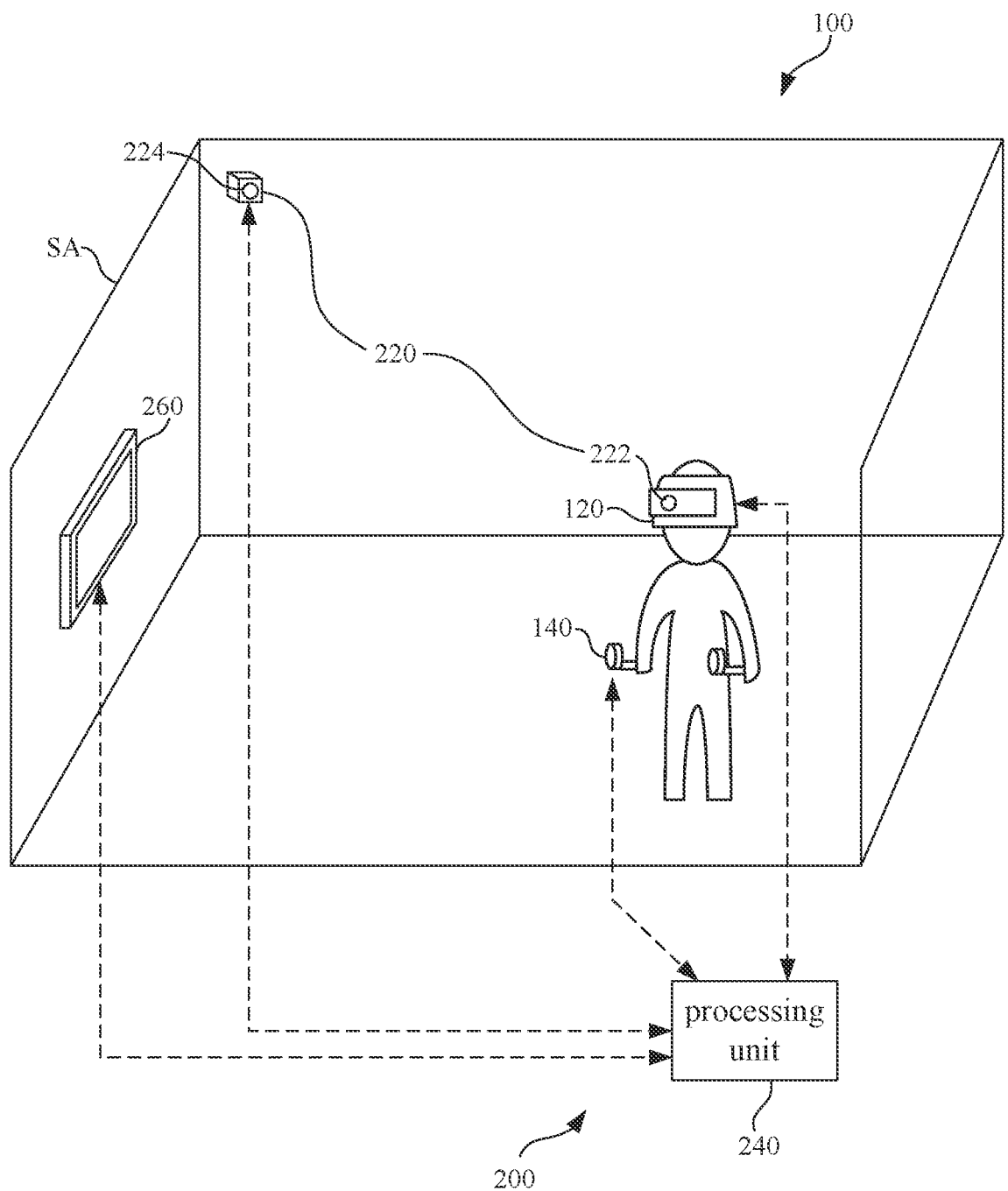
FIG. 1 is a schematic diagram illustrating an immersive system and a calibration system cooperated with the immersive system according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1, which is a schematic diagram illustrating an immersive system 100 and a calibration system 200 cooperated with the immersive system according to an embodiment of this disclosure. As shown in FIG. 1, the immersive system 100 includes a head-mounted display device 120 and a handheld controller 140 located in a spatial area SA. For example, the spatial area SA as shown in FIG. 1 can be a bedroom or a conference room in the real world, but the disclosure is not limited thereto. In some other embodiments, the spatial area SA can also be a specific area at an outdoor space (not shown in figures).

In some embodiments, the head-mounted display device 120 can be mounted on the head of the user U1, and the handheld controller 140 can be hold in one hand of the user U1. In some embodiments, the head-mounted display device 120 can provide immersive contents, such as a Virtual Reality (VR), an Augmented Reality (AR), a Substitutional Reality (SR) and/or a Mixed Reality (MR) scenario, to the user. In order to provide the immersive contents to the users, the immersive system 100 is configured to track the head-mounted device 120 for detecting the position and the rotation of user's movement. There are several methods (e.g., an outside-in tracking based on optical or ultrasound signals, an inside-out tracking based on image recognition) about tracking the head-mounted display device 120. A skilled person in the art will understand how to track the head-mounted display device 120, such that the tracking of the head-mounted display device 120 will not be discussed in the following paragraphs.

Figure 2:
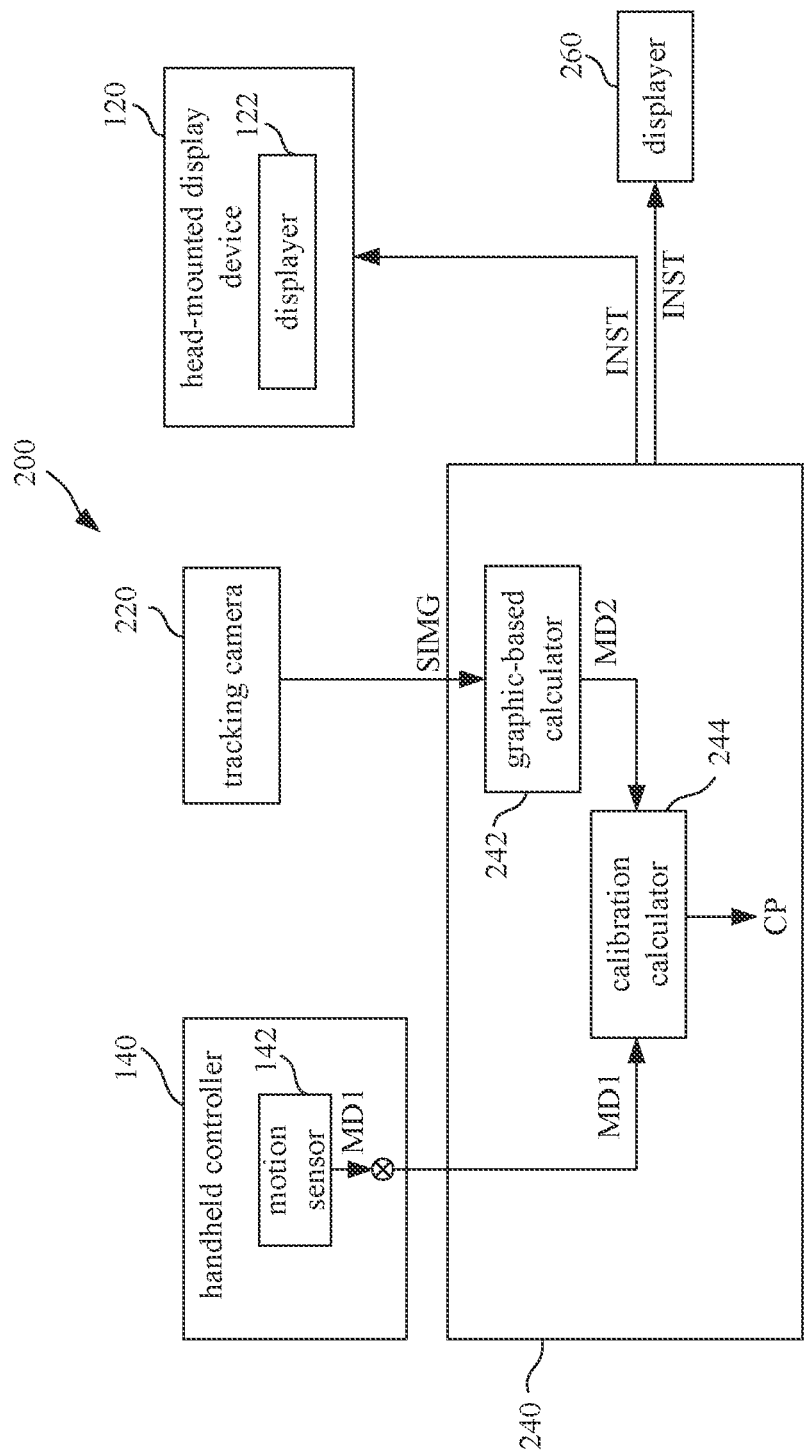
FIG. 2 is a schematic diagram illustrating the immersive system and the calibration system shown in FIG. 1 in a calibration procedure.

In order to provide the immersive contents to the users, the immersive system 100, it is also required to track the handheld controller 140 for detecting the position and the rotation of user's hand gestures. The user may manipulate the handheld controller 140 to perform various hand gestures (e.g., tapping, stabbing, waving, knocking, or other gestures). In some embodiments, movements of the handheld controller 140 are tracked according to first movement data generated by a motion sensor embedded in the handheld controller 140. Reference is further made to FIG. 2, which is a schematic diagram illustrating the immersive system 100 and the calibration system 200 shown in FIG. 1 in a calibration procedure.

As shown in FIG. 2, the handheld controller 140 may include a motion sensor 142, and the motion sensor 142 is able to detect the first movement data MD1 while the handheld controller 140 moving. In some embodiments, the motion sensor 142 may include at least one of an inertial measurement unit (IMU), a gyroscope sensor and an accelerometer embedded in the handheld controller 140.

In some embodiments, the inertial measurement unit (or the gyroscope sensor) of the motion sensor 142 is configured to detect first angular velocities relative to three directional axes while the handheld controller 140 moving in the spatial area SA. These first angular velocities relative to three directional axes can be respectively integrated over time to determine first angular rotations relative to three directional axes. In this case, the first movement data MD1 may include first angular rotations relative to three directional axes.

In some embodiments, the inertial measurement unit (or the accelerometer) of the motion sensor 142 is configured to detect first accelerations relative to three directional axes while the handheld controller 140 moving in the spatial area SA. These first accelerations relative to three directional axes can be respectively double integrated over time to determine first positional displacements relative to three directional axes. In this case, the first movement data MD1 may include first positional displacements relative to three directional axes.

In order to track the handheld controller 140, it is important to ensure correctness and preciseness of the first movement data MD1 generated by the motion sensor 142. In general, some detection distortions may occur to the first movement data MD1 generated by the motion sensor 142 due to manufacturing differences. Therefore, it is necessary to calibrate the motion sensor 142 to make sure the motion sensor 142 work properly.

In some cases, the calibration about the motion sensor is performed based on the movement data generated by the motion sensor itself. For example, the motion sensor repeatedly generates the movement data in different rounds and the motion sensor calibrates itself based on the movement data in different rounds. However, if the movement data generated by the motion sensor is not accurate in the first place, the calibration on the motion sensor is not ideal. In some extreme cases, distortions on the motion sensor may accumulate over repeatedly calibrations, and aforesaid calibrations may make the motion sensor even more inaccurate.

In some embodiments, a calibration system 200 is configured to calibrate the motion sensor 142 embedded in the handheld controller 140 in reference with another movement data generated by an external source (other than the motion sensor 142 itself), such that the motion sensor 142 can be calibrated properly according to an outside reference standard.

As shown in embodiments illustrated in FIG. 1 and FIG. 2, the calibration system 200 includes a tracking camera 220 and a processing unit 240. The tracking camera 220 is configured to capture streaming images SIMG involving a movement of the handheld controller 140. The handheld controller 140 is movable in a field of view of the tracking camera 220. The tracking camera 220 is disposed at a position separated from the handheld controller 140, so as to observe the handheld controller 140 from an outside point of view. As shown in FIG. 1, the tracking camera 220 includes a first tracking camera 222, which is integrated with the head-mounted display device 120 and disposed on a front surface of the head-mounted display device 120. In this case, the first tracking camera 222 is able to observe the handheld controller 140 from a viewpoint of the head-mounted display device 120. As shown in FIG. 1, the tracking camera 220 includes a second tracking camera 224, which is a stand-alone camera 224 disposed at a fixed point (e.g., at a top corner around the ceiling) in the spatial area SA. In this case, the second tracking camera 224 is able to observe the handheld controller 140 from an upside-down viewpoint. The tracking camera 220 in the calibration system 200 can be implemented by at least one of the first tracking camera 222 and the second tracking camera 224. The disclosure is not limited thereto embodiments shown in FIG. 1. In some other embodiments, the tracking camera 220 can be implemented in other equivalent camera configuration, which includes a tracking camera separated from the handheld controller 140.

The streaming images SIMG captured by the tracking camera 220 indicate a position and a rotation of the handheld controller 140 in view of the tracking camera 220. As shown in FIG. 2, the processing circuit 240 is configured to receive the streaming images SIMG captured by the tracking camera 220. As shown in FIG. 2, the processing circuit 240 includes a graphic-based calculator 242 and a calibration calculator 244. The graphic-based calculator 242 in the processing circuit 240 is configured to analyze the streaming images SIMG for generating the second movement data MD2.

Figure 3:
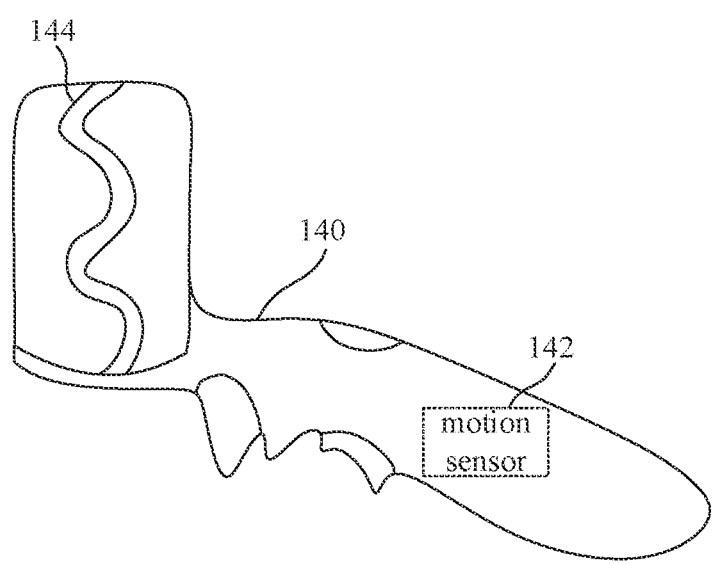
FIG. 3 is a schematic diagram illustrating an appearance of the handheld controller according to some embodiments of the disclosure.

Reference is further made to FIG. 3, which is a schematic diagram illustrating an appearance of the handheld controller 140 according to some embodiments of the disclosure. As shown in FIG. 3, in some embodiments, the handheld controller 140 includes a motion sensor 142 embedded in the handheld controller 140 and a feature pattern 144 (can be an icon, a light-emitting pattern, a colored pattern) disposed on the handheld controller. The graphic-based calculator 242 is configured to recognize and track the feature pattern 144 or a contour of the handheld controller 140 located in different frames in the streaming images SIMG, so as to calculate in the second movement data MD2. For example, the graphic-based calculator 242 can calculate second angular rotations relative to the three directional axes (and/or second positional displacements relative to the three directional axes), by comparing the same feature pattern 144 appeared in different frames in the streaming images SIMG, while the handheld controller moving along the predetermined route.

The calibration calculator 244 is configured to compare the first movement data MD1 (generated by the handheld controller 140) and the second movement data MD2 (originally observed by the tracking camera 220) for generating calibration parameters CP, so as to calibrate possible distortions existed in the first movement data MD1. Further details about how to calculate the calibration parameters CP will be discussed in following paragraphs.

In some embodiments, the processing unit 240 can be a processor, a central processing unit (CPU), a graphic processing unit (GPU), a tensor processing unit (TPU) or an application specific integrated circuit (ASIC) in a computer or a smartphone separated from the head-mounted display device 120. In some other embodiments, the processing unit 240 can be implemented by a processor, a central processing unit (CPU), a graphic processing unit (GPU), a tensor processing unit (TPU) or an application specific integrated circuit (ASIC) integrated in the head-mounted display device 120. In some embodiments, the graphic-based calculator 242 and the calibration calculator 244 can be implemented by software instructions executed by the processing unit 240 or implemented by application specific integrated circuits in the processing unit 240.

Figure 4:
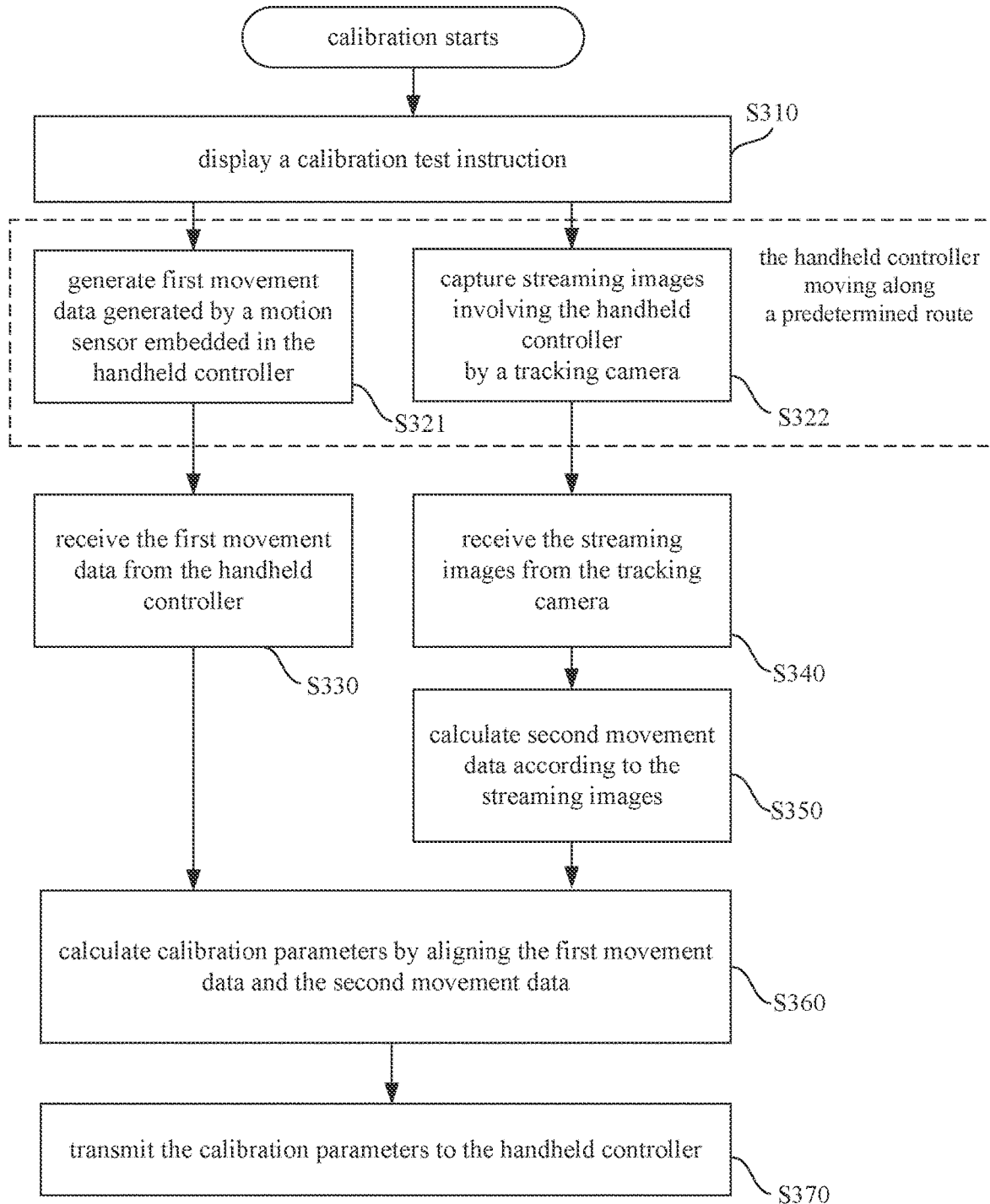
FIG. 4 is a flowchart diagram illustrating a calibration method according to some embodiments of the disclosure.

Reference is further made to FIG. 4, which is a flowchart diagram illustrating a calibration method 300 according to some embodiments of the disclosure. The calibration method 300 shown in FIG. 4 can be executed by the immersive system 100 and the calibration system 200 shown in FIG. 1 and FIG. 2. In some embodiments shown in FIG. 2 and FIG. 4, when the calibration starts, step S310 is executed, the processing unit 240 will generate a calibration test instruction INST to a displayer 122 in the head-mounted display device 120 or a stand-alone displayer 260 (as shown in FIG. 1 and FIG. 2) separated from the head-mounted display device 120.

If the user is not wearing the head-mounted display device 120, the calibration test instruction INST can be transmitted to and displayed on the stand-alone displayer 260, which can be a television, a smart television, a smart monitor or similar equipment capable of communicating with the processing unit 240. In this case, it will be more convenient for the user to perform the calibration without wearing the head-mounted display device 120.

The calibration test instruction INST is configured to guide a user to move the handheld controller 140 along a predetermined route, so as to enhance an efficiency of the calibration. For example, the calibration test instruction INST suggests the user to do a pitch gesture (i.e., rotation relative to a steady side-to-side axis), a roll gesture (i.e., rotation relative to a steady front-to-back axis) or a yaw gesture (i.e., rotation relative to a steady vertical axis). The displayer 122 (or the displayer 260) can display the calibration test instruction INST, and the user can follow the calibration test instruction INST to move the handheld controller 140 along the predetermined route as requested. In some embodiments, the calibration test instruction INST can include text instructions, graphic instructions or animation guidance. In addition, the calibration test instruction INST may also include voice instructions broadcasted along with aforesaid visual instructions.

While the handheld controller 140 moving along the predetermined route, steps S321 and S322 are executed simultaneously. Step S321 is executed by the motion sensor 142 embedded in the handheld controller 140 to generate the first movement data MD1. Step S322 is executed by the tracking camera 220 to capture the streaming image SIMG involving the handheld controller 140.

In step S330, the processing unit 240 receives the first movement data MD1 from the handheld controller 140. In step S340, the processing unit 240 receives the streaming images SIMG from the tracking camera 220. In step S350, the graphic-based calculator 242 is configured to recognize and track the feature pattern 144 (referring to FIG. 3) or a contour of the handheld controller 140 located in different frames in the streaming images SIMG, so as to calculate in the second movement data MD2.

In step S360, the calibration calculator 244 of the processing unit 240 is configured to calculate the calibration parameters CP by comparing the first movement data and the second movement data.

Figure 5:
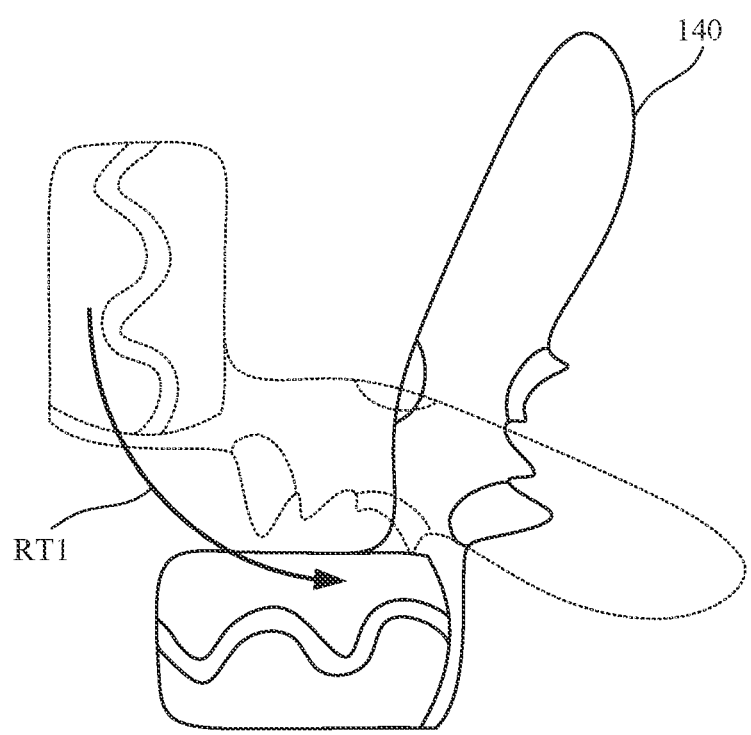
FIG. 5 is a schematic diagram illustrating the handheld controller moving along a predetermined route in a demonstrational example.
Figure 6:
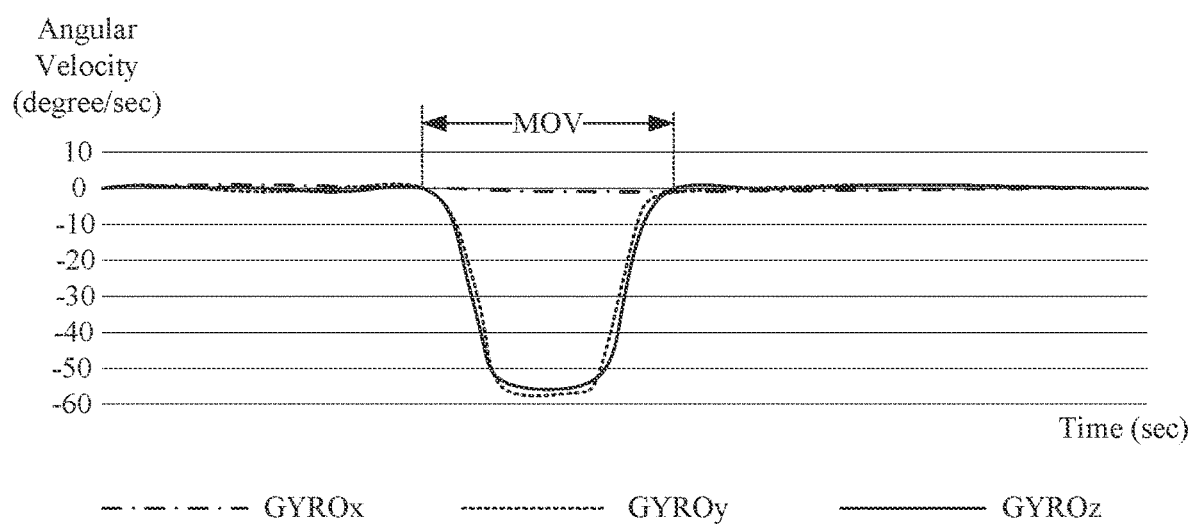
FIG. 6 is a schematic diagram illustrating angular velocities relative to the three directional axes detected by the motion sensor embedded in the handheld controller while the handheld controller moving along the predetermined route as shown in FIG. 5.

In a demonstrational example, when the first movement data MD1 includes first angular rotations relative to three directional axes and the second movement data MD2 includes second angular rotations relative to the three directional axes, the calibration parameters calculated by the calibration calculator 244 in step S360 will includes a first calibration matrix to align the first angular rotations with the second angular rotations. Reference is further made to FIG. 5 and FIG. 6. FIG. 5 is a schematic diagram illustrating the handheld controller 140 moving along a predetermined route RT1 in a demonstrational example. FIG. 6 is a schematic diagram illustrating angular velocities relative to the three directional axes detected by the motion sensor 142 embedded in the handheld controller 140 while the handheld controller 140 moving along the predetermined route RT1 as shown in FIG. 5.

As shown in FIG. 5, the handheld controller 140 is moved along a downward pitch gesture. In other words, a head portion of the handheld controller 140 is rotated toward the ground. In FIG. 6, the inertial measurement unit or the gyroscope sensor is configured to detect three angular velocities relative to the three directional axes during a movement MOV of the handheld controller 140. As shown in FIG. 6, an angular velocity GYROx along X-axis remains around 0; an angular velocity GYROy along Y-axis and another angular velocity GYROz along Z-axis indicate the downward rotation. The angular velocity GYROx can be integrated over time into a first angular rotation R_Ximu along X-axis; the angular velocity GYROy can be integrated over time into another first angular rotation R_Yimu along Y-axis; the angular velocity GYROz can be integrated over time into another first angular rotation R_Zimu along Z-axis. The first movement data MD1 include these first angular rotations R_Ximu, R_Yimu and R_Zimu.

On the other hand, the graphic-based calculator 242 is configured to generate the second movement data MD2 according to the streaming images SIMG. The second movement data MD2 includes second angular rotations R_Xcam, R_Ycam and R_Zcam relative to the three directional axes while the handheld controller 140 moving along the predetermined route RT1.

In some embodiments, the calibration parameters CP includes a first calibration matrix CM1 to align the first angular rotations (R_Ximu, R_Yimu and R_Zimu) with the second angular rotations (R_Xcam, R_Ycam, R_Zcam). In some embodiments, the calibration calculator 244 calculates the first calibration matrix CM1 based the following equation (1).

$$\begin{bmatrix} R\_Xcam \\ R\_Ycam \\ R\_Zcam \end{bmatrix} = \begin{bmatrix} R\_Ximu \\ R\_Yimu \\ R\_Zimu \end{bmatrix} * \begin{bmatrix} R11 & R12 & R13 \\ R21 & R22 & R23 \\ R31 & R32 & R33 \end{bmatrix} \quad (1)$$

In the equation (1), $$\begin{bmatrix} R11 & R12 & R13 \\ R21 & R22 & R23 \\ R31 & R32 & R33 \end{bmatrix}$$

is the first calibration matrix M1 to align the first angular rotations (R_Ximu, R_Yimu and R_Zimu) in reference with the second angular rotations (R_Xcam, R_Ycam, R_Zcam).

It is assumed that, because the handheld controller 140 is moved along the predetermined route RT1 as shown in FIG. 5, the second angular rotations (R_Xcam, R_Ycam, R_Zcam) are equal to (0, −90, −90). Therefore, the equation (1) can be updated as the following equation (2).

$$\begin{bmatrix} 0 \\ -90 \\ -90 \end{bmatrix} = \begin{bmatrix} R\_Ximu \\ R\_Yimu \\ R\_Zimu \end{bmatrix} * \begin{bmatrix} R11 & R12 & R13 \\ R21 & R22 & R23 \\ R31 & R32 & R33 \end{bmatrix} \quad (2)$$

In the equation (2), the first angular rotations (R_Ximu, R_Yimu and R_Zimu) are already known, and the second angular rotations (R_Xcam, R_Ycam, R_Zcam) are also known as (0, −90, −90), such that calibration values R11~R33 in the first calibration matrix CM1 can be calculated by the calibration calculator 244. As shown above, the first calibration matrix CM1 is able to calibrate the first angular rotations (R_Ximu, R_Yimu and R_Zimu) generated from the motion sensor 142 in the handheld controller 140 to be aligned with the second angular rotations (R_Xcam, R_Ycam, R_Zcam), which are based on the streaming images captured by the tracking camera 220. Therefore, the calibration method 300 is able to calibrate the first movement data MD1 of the generated from the motion sensor 142, in reference with another reference signal (i.e., the second movement data MD2) other than the first movement data MD1 generated by the handheld controller 140 itself. In this case, the calibration to the motion sensor 142 embedded in the handheld controller 140 can be more objective, and distortions on the motion sensor 142 will not accumulate over repeatedly calibrations.

The predetermined route RT1 is not limited to the downward pitching as shown in FIG. 5. In another example, the calibration test instruction INST can suggest the user to perform another predetermined route, such as a rightward yaw gesture.

It is assumed that, because the handheld controller 140 is moved along the rightward yaw gesture, the second angular rotations (R_Xcam, R_Ycam, R_Zcam) are equal to (90, 0, 90). Therefore, the equation (1) can be updated as the following equation (3).

$$\begin{bmatrix} 90 \\ 0 \\ 90 \end{bmatrix} = \begin{bmatrix} R\_Ximu \\ R\_Yimu \\ R\_Zimu \end{bmatrix} * \begin{bmatrix} R11 & R12 & R13 \\ R21 & R22 & R23 \\ R31 & R32 & R33 \end{bmatrix} \quad (3)$$

In the equation (3), the first angular rotations (R_Ximu, R_Yimu and R_Zimu) are already known, and the second angular rotations (R_Xcam, R_Ycam, R_Zcam) are also known as (90, 0, 90), such that calibration values R11~R33 in the first calibration matrix CM1 can be calculated by the calibration calculator 244.

In some embodiments, the first calibration matrix CM1 calculated corresponding to different predetermined routes are combined by average as the calibration parameters CP.

After the calibration parameters CP are calculated by the calibration calculator 244 in step S360, step S370 is executed. In step S370, the processing unit 240 will transmit the calibration parameters CP back to the handheld controller 140. The handheld controller 140 can utilize the calibration parameters CP to calibrate the first movement data MD1 generated by the motion sensor 142.

Figure 7:
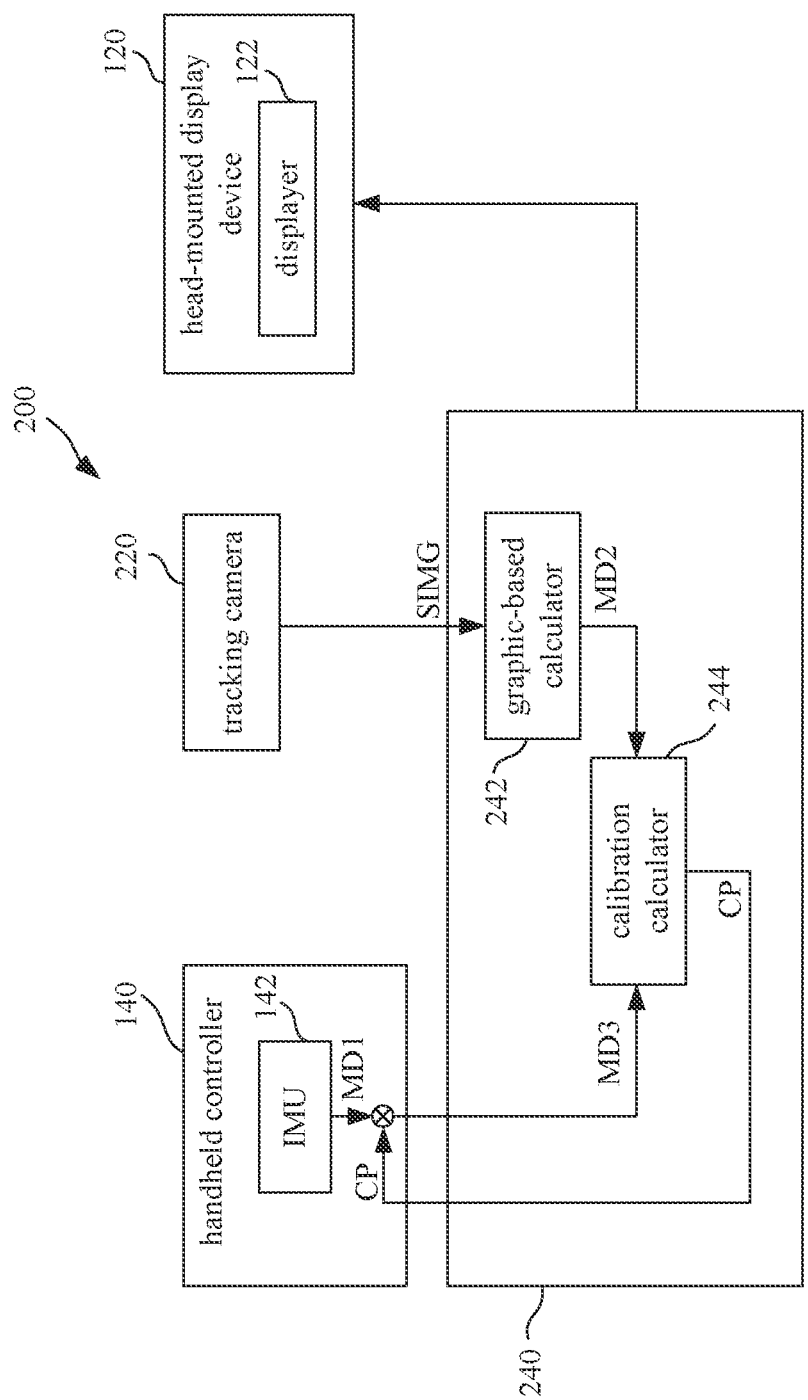
FIG. 7 is a schematic diagram illustrating the immersive system and the calibration system shown in FIG. 1 after the calibration procedure.

Reference is further made to FIG. 7, which is a schematic diagram illustrating the immersive system 100 and the calibration system 200 shown in FIG. 1 after the calibration procedure. As shown in FIG. 7, the calibration parameters CP are utilized by the handheld controller 140 in generating a third movement data MD3. The third movement data MD3 can be a product between the first movement data MD1 and the calibration parameters CP (e.g., the first calibration matrix CM1).

In aforesaid embodiments, the first calibration matrix CM1 is able to calibrate the first angular rotations of the first movement data MD1 detected by an inertial measurement unit or a gyroscope sensor embedded in the handheld controller 140. However, the disclosure is not limited thereto.

Figure 8:
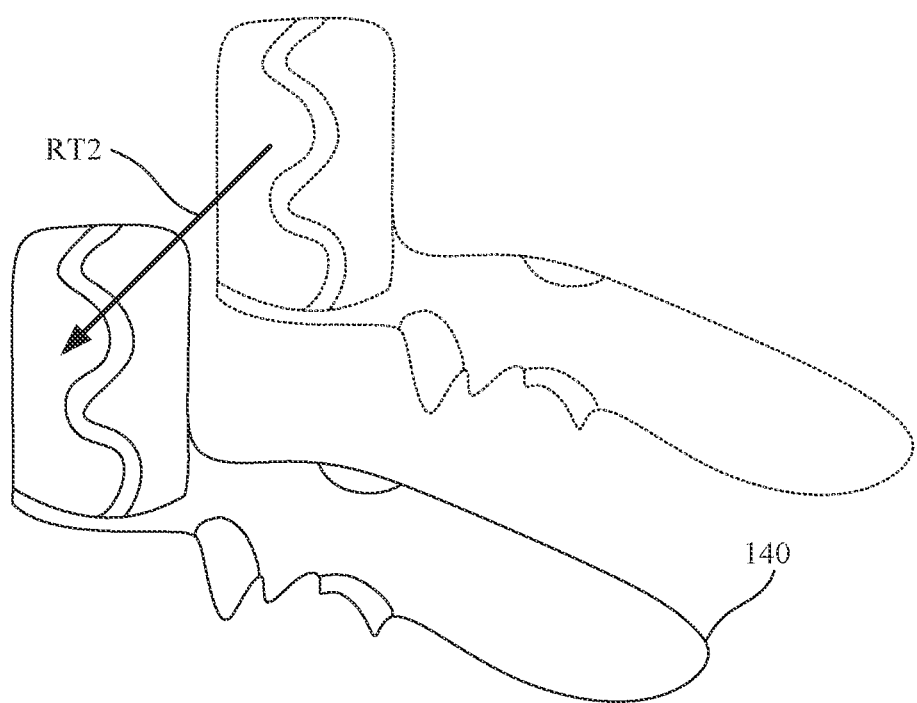
FIG. 8 is a schematic diagram illustrating the handheld controller moving along another predetermined route in a demonstrational example.

In some other embodiments, the first movement data MD1 may include first positional displacements relative to three directional axes while the handheld controller 140 moving. FIG. 8 is a schematic diagram illustrating the handheld controller 140 moving along another predetermined route RT2 in a demonstrational example.

In the demonstrational example shown in FIG. 2 and FIG. 8, the motion sensor 142 (including the inertial measurement unit or an accelerometer) embedded in the handheld controller 140 is configured to detect three accelerations relative to the three directional axes. The first positional displacements relative to three directional axes, about the movement of the handheld controller 140, can be calculated according to double integral values of the accelerations over time. In this case, the first movement data MD1 include first positional displacements determined according to the accelerations detected by the motion sensor 142.

In the meantime, the each of the streaming images SIMG includes a pattern disposed on the handheld controller 140 or a contour of the handheld controller 140. The graphic-based calculator 242 of the processing unit 240 calculates second positional displacements relative to three directional axes in the second movement data MD2, by tracking the pattern or the contour of the handheld controller 140 in different frames of the streaming images SIMG.

The first movement data MD1 include first positional displacements relative to three directional axes in response to the handheld controller 140 moving along another predetermined route RT2. In the meantime time, the second movement data MD2 will also include second positional displacements along the three direction axes while the handheld controller moving along the predetermined route RT2.

The calibration calculator 244 is able calibrates a second calibration matrix CM2 of the calibration parameter CP to align the first positional displacements with the second positional displacements.

It is assumed that, because the handheld controller 140 is moved along the predetermined route RT2 as shown in FIG. 8, the first position displacements detected by the motion sensor 142 are (D_Ximu, D_Yimu, D_Zimu) relative to three directional axes and the second positional displacements based on the tracking camera 220 are equal to (0, 20, −20). The second calibration matrix CM2 can be calculated as the following equation (4).

$$\begin{bmatrix} 0 \\ 20 \\ -20 \end{bmatrix} = \begin{bmatrix} D\_Ximu \\ D\_Yimu \\ D\_Zimu \end{bmatrix} + \begin{bmatrix} DX \\ DY \\ DZ \end{bmatrix} \quad (4)$$

In the equation (4)

$$\begin{bmatrix} DX \\ DY \\ DZ \end{bmatrix}$$

is the calibration matrix CM2 to align the first position displacements (D_Ximu, D_Yimu, D_Zimu) in reference with the second positional displacements (0, 20, −20).

In the equation (4), the first position displacements (D_Ximu, D_Yimu, D_Zimu) are already known, and the second position displacements are also known as (0, 20, −20), such that calibration values DX~DZ in the second calibration matrix CM2 can be calculated by the calibration calculator 244. In some embodiments, the calibration parameters CP include the second calibration matrix CM2. The calibration parameters CP can be transmitted back to the handheld controller 140 for calibrating the detection about the position displacements.

In some embodiments, the calibration parameters CP include both of the first calibration matrix CM1 and the second calibration matrix CM2 in aforesaid embodiments. The calibration parameters CP can be transmitted back to the handheld controller 140 for calibrating the detection about the angular rotations and the detection about the position displacements.

Another embodiment of the disclosure includes a non-transitory computer-readable storage medium, which stores at least one instruction program executed by a processing unit (referring to the processing unit 240 shown in FIG. 1 and FIG. 2 discussed in aforesaid embodiments) to perform a calibration method 300 as shown in FIG. 4.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A calibration system, configured to calibrate a handheld controller, the calibration system comprising:
   a tracking camera, configured to capture a plurality of streaming images involving the handheld controller;
   a displayer, configured to display a calibration test instruction about moving the handheld controller along a predetermined route;
   a processing unit, communicated with the tracking camera and the displayer, configured to:
      receive first movement data generated by the handheld controller while the handheld controller moving along the predetermined route;
      receive the streaming images captured by the tracking camera generated while the handheld controller moving along the predetermined route;
      calculate second movement data according to the streaming images;
      calculate calibration parameters by comparing the first movement data and the second movement data; and
      transmit the calibration parameters to the handheld controller, wherein the calibration parameters are utilized by the handheld controller in generating a third movement data.

2. The calibration system of claim 1, wherein the first movement data comprises first angular rotations relative to three directional axes while the handheld controller moving along the predetermined route, and the second movement data comprises second angular rotations relative to the three directional axes while the handheld controller moving along the predetermined route, the calibration parameters comprises a first calibration matrix to align the first angular rotations with the second angular rotations.

3. The calibration system of claim 2, wherein the first movement data is generated based on an inertial measurement unit or a gyroscope sensor embedded in the handheld controller, the inertial measurement unit or the gyroscope sensor is configured to detect three angular velocities relative to the three directional axes, the first angular rotations in the first movement data are determined according to integral values of the angular velocities over time.

4. The calibration system of claim 2, wherein each of the streaming images comprises a feature pattern disposed on the handheld controller or a contour of the handheld controller, the processing unit calculates the second angular rotations in the second movement data by tracking the feature pattern or the contour in the streaming images.

5. The calibration system of claim 1, wherein the first movement data comprises first positional displacements relative to three directional axes while the handheld controller moving along the predetermined route, and the second movement data comprises second positional displacements along the three directional axes while the handheld controller moving along the predetermined route, the calibration parameters comprise a second calibration matrix to align the first positional displacements with the second positional displacements.

6. The calibration system of claim 5, wherein the first movement data is generated based on an inertial measurement unit or an accelerometer embedded in the handheld controller, the inertial measurement unit or the accelerometer is configured to detect three accelerations relative to the three directional axes, the first positional displacements in the first movement data are determined according to double integral values of the accelerations over time.

7. The calibration system of claim 5, wherein each of the streaming images comprises a pattern disposed on the handheld controller or a contour of the handheld controller, the processing unit calculates the second positional displacements in the second movement data by tracking the pattern or the contour in the streaming images.

8. The calibration system of claim 1, wherein the handheld controller is movable in a field of view of the tracking camera, the tracking camera is disposed at a position separated from the handheld controller, the streaming images indicate a position and a rotation of the handheld controller in view of the tracking camera.

9. The calibration system of claim 8, wherein the tracking camera is disposed on a head-mounted display device or disposed at a fixed position.

10. A calibration method, comprising:
generating first movement data by a motion sensor embedded in a handheld controller while the handheld controller moving along a predetermined route corresponding to a calibration test instruction displayed on a displayer about moving the handheld controller along the predetermined route;
capturing a plurality of streaming images involving the handheld controller by a track camera while the handheld controller moving along the predetermined route corresponding to the calibration test instruction;
calculating second movement data according to the streaming images;
calculating calibration parameters by comparing the first movement data and the second movement data; and
transmitting the calibration parameters to the handheld controller, wherein the calibration parameters are utilized by the handheld controller in generating a third movement data.

11. The calibration method of claim 10, wherein the first movement data comprises first angular rotations relative to three directional axes while the handheld controller moving along the predetermined route, and the second movement data comprises second angular rotations relative to the three directional axes while the handheld controller moving along the predetermined route, the step of calculating calibration parameters comprising:
calculating a first calibration matrix for aligning the first angular rotations with the second angular rotations.

12. The calibration method of claim 11, wherein the first movement data is generated based on an inertial measurement unit or a gyroscope sensor embedded in the handheld controller, the inertial measurement unit or the gyroscope sensor is configured to detect three angular velocities relative to the three directional axes, the first angular rotations in the first movement data are determined according to integral values of the angular velocities over time.

13. The calibration method of claim 11, wherein each of the streaming images comprises a pattern disposed on the handheld controller or a contour of the handheld controller, the second angular rotations in the second movement data are calculated by tracking the pattern or the contour in the streaming images.

14. The calibration method of claim 10, wherein the first movement data comprises first positional displacements relative to three directional axes while the handheld controller moving along the predetermined route, and the second movement data comprises second positional displacements along the three directional axes while the handheld controller moving along the predetermined route, the step of calculating calibration parameters comprising:
calculating a second calibration matrix for aligning the first positional displacements in reference with the second positional displacements.

15. The calibration method of claim 14, wherein the first movement data is generated based on an inertial measurement unit or an accelerometer embedded in the handheld controller, the inertial measurement unit or the accelerometer is configured to detect three accelerations relative to the three directional axes, the first positional displacements in the first movement data are determined according to double integral values of the accelerations over time.

16. The calibration method of claim 15, wherein each of the streaming images comprises a pattern disposed on the handheld controller or a contour of the handheld controller, the second positional displacements in the second movement data are calculated by tracking the pattern or the contour in the streaming images.

17. The calibration method of claim 10, wherein the handheld controller is movable in a field of view of the tracking camera, the tracking camera is disposed at a position separated from the handheld controller, the streaming images indicate a position and a rotation of the handheld controller in view of the tracking camera.

18. A non-transitory computer-readable storage medium, storing at least one instruction program executed by a processing unit to perform a calibration method, the calibration method comprising:
generating first movement data by a motion sensor embedded in a handheld controller while the handheld controller moving along a predetermined route corresponding to a calibration test instruction displayed on a displayer about moving the handheld controller along the predetermined route;
capturing a plurality of streaming images involving the handheld controller by a track camera while the handheld controller moving along the predetermined route corresponding to the calibration test instruction;
calculating second movement data according to the streaming images;
calculating calibration parameters by comparing the first movement data and the second movement data; and
transmitting the calibration parameters to the handheld controller, wherein the calibration parameters are utilized by the handheld controller in generating a third movement data.

19. The non-transitory computer-readable storage medium of claim 18, wherein the first movement data comprises first angular rotations relative to three directional axes while the handheld controller moving along the predetermined route, and the second movement data comprises second angular rotations relative to the three directional axes while the handheld controller moving along the predetermined route, the step of calculating calibration parameters comprising:
calculating a first calibration matrix for aligning the first angular rotations with the second angular rotations.

20. The non-transitory computer-readable storage medium of claim 18, wherein the first movement data comprises first positional displacements relative to three directional axes while the handheld controller moving along the predetermined route, and the second movement data comprises second positional displacements along the three directional axes while the handheld controller moving along the predetermined route, the step of calculating calibration parameters comprising:
    calculating a second calibration matrix for aligning the first positional displacements in reference with the second positional displacements.

* * * * *